(12) United States Patent
Rowitch et al.

(10) Patent No.: US 7,505,757 B2
(45) Date of Patent: Mar. 17, 2009

(54) LOCATION BASED SERVICE (LBS) SYSTEM, METHOD AND APPARATUS FOR TRIGGERING OF MOBILE STATION LBS APPLICATIONS

(75) Inventors: Douglas Rowitch, Del Mar, CA (US); Kirk Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 10/770,878

(22) Filed: Feb. 2, 2004

(65) Prior Publication Data
US 2004/0235454 A1 Nov. 25, 2004

Related U.S. Application Data

(60) Provisional application No. 60/444,248, filed on Jan. 31, 2003, provisional application No. 60/445,815, filed on Feb. 5, 2003.

(51) Int. Cl.
- H04B 1/04 (2006.01)
- H04M 3/42 (2006.01)
- H04M 3/493 (2006.01)
- H04Q 7/22 (2006.01)
- H04Q 7/20 (2006.01)

(52) U.S. Cl. .............. 455/411; 455/456.1; 455/456.2; 455/456.3; 455/414.2; 455/466

(58) Field of Classification Search ............... 455/411, 455/456.1–456.6, 414.2, 466
See application file for complete search history.

(56) References Cited

U.S. PATENT DOCUMENTS 4,445,118 A 4/1984 Taylor et al.

(Continued)

FOREIGN PATENT DOCUMENTS

WO 02058414 7/2002

OTHER PUBLICATIONS

International Search Report ISA EPO PCT/US2004/002938 Oct. 4, 2004.

(Continued)

*Primary Examiner*—Vincent P Harper
*Assistant Examiner*—Ariel Balaoing
(74) *Attorney, Agent, or Firm*—Andrea L. Mays; Linda G. Gunderson; Thomas R. Rouse

(57) ABSTRACT

An application executed within a mobile station to be triggered only by a network element, such as a mobile positioning center (MPC) or a Mobile Center (MC). The network element is coupled to a base station. The network element is responsible for authorizing an application that is either resident within the mobile station or that is run in a device that is resident elsewhere in the network. The mobile station communicates with the network element over a communication link through the base station and other infrastructure components. The mobile station will only respond to attempts to trigger particular operations (e.g., run particular applications) if the mobile station receives a short message services (SMS) message as defined by Interim Specification 637A (IS-637A) which is published by the Telecommunication Industry Association (TIA)/Electronics Industry Association (EIA). More specifically, that SMS message must include an SMS Teleservice Identifier that has a particular pre-assigned value.

12 Claims, 4 Drawing Sheets

U.S. PATENT DOCUMENTS

| | | | |
|---|---|---|---|
| 5,589,835 | A | 12/1996 | Gildea et al. |
| 5,841,396 | A | 11/1998 | Krasner |
| 5,872,539 | A | 2/1999 | Mullen |
| 5,913,170 | A | 6/1999 | Wortham |
| 5,999,125 | A | 12/1999 | Kurby |
| 6,070,078 | A | 5/2000 | Camp et al. |
| 6,085,099 | A | 7/2000 | Ritter et al. .................. 455/466 |
| 6,112,078 | A | 8/2000 | Sormunen et al. ........... 455/411 |
| 6,133,874 | A | 10/2000 | Krasner |
| 6,138,003 | A * | 10/2000 | Kingdon et al. ............. 455/410 |
| 6,150,980 | A | 11/2000 | Krasner |
| 6,266,533 | B1 | 7/2001 | Zadeh et al. |
| 6,429,808 | B1 | 8/2002 | King et al. |
| 6,456,843 | B1 | 9/2002 | Daly ........................ 455/419 |
| 6,535,815 | B2 * | 3/2003 | Bloebaum ................... 701/213 |
| 6,625,458 | B2 | 9/2003 | Pihl et al. |
| 6,754,482 | B1 * | 6/2004 | Torabi ........................ 455/410 |
| 6,937,865 | B1 | 8/2005 | Bloebaum |
| 6,957,073 | B2 | 10/2005 | Bye |
| 6,987,964 | B2 | 1/2006 | Obradovich et al. |
| 6,993,429 | B2 | 1/2006 | Obradovich et al. |
| 7,043,363 | B2 | 5/2006 | Yamamoto et al. |
| 7,076,256 | B1 | 7/2006 | Orler et al. |
| 2001/0018663 | A1 | 8/2001 | Dussell et al. |
| 2002/0029108 | A1 | 3/2002 | Liu et al. |
| 2002/0094822 | A1 * | 7/2002 | Anctil et al. ................. 455/456 |
| 2002/0101374 | A1 | 8/2002 | Mutoh et al. |
| 2002/0102988 | A1 | 8/2002 | Myllymaki |
| 2002/0115453 | A1 * | 8/2002 | Poulin et al. ................. 455/456 |
| 2002/0154058 | A1 | 10/2002 | Pande et al. |
| 2002/0160766 | A1 * | 10/2002 | Portman et al. ............. 455/422 |
| 2002/0177449 | A1 * | 11/2002 | McDonnell et al. ......... 455/456 |
| 2002/0177949 | A1 | 11/2002 | Katayama et al. |
| 2002/0196189 | A1 | 12/2002 | Choi |
| 2003/0069694 | A1 | 4/2003 | Fuchs et al. |
| 2003/0070091 | A1 | 4/2003 | Loveland |
| 2003/0087629 | A1 | 5/2003 | Juitt et al. |
| 2003/0119528 | A1 * | 6/2003 | Pew et al. .................... 455/456 |
| 2003/0139175 | A1 * | 7/2003 | Kim ........................... 455/419 |
| 2004/0064707 | A1 * | 4/2004 | McCann et al. ............. 713/185 |
| 2004/0073365 | A1 | 4/2004 | Alanen et al. |
| 2004/0139204 | A1 | 7/2004 | Ergezinger et al. |
| 2004/0148090 | A1 | 7/2004 | Melen |
| 2004/0203903 | A1 | 10/2004 | Wilson et al. |
| 2004/0235454 | A1 | 11/2004 | Rowicth et al. |
| 2004/0242209 | A1 * | 12/2004 | Kruis et al. ............. 455/414.1 |
| 2005/0128102 | A1 | 6/2005 | Obradovich et al. |

OTHER PUBLICATIONS

International Search Report ISA EPO PCT/US2004/002936 Oct. 4, 2004.

* cited by examiner

LOCATION BASED SERVICE (LBS) SYSTEM, METHOD AND APPARATUS FOR TRIGGERING OF MOBILE STATION LBS APPLICATIONS

This application claims the benefit of provisional U.S. Application Ser. No. 60/444,248, filed on Jan. 31, 2003 and U.S. Provisional Application Ser. No. 60/445,815, filed Feb. 5, 2003, and incorporated herein by reference in its entirety for all purposes.

BACKGROUND

1. Field

The present invention relates generally to communication, and more specifically to a system, method and apparatus for performing location determination by triggering a location based application to run within a mobile station of a communication system.

2. Background

Often, it is desirable to know the location of a wireless user. In fact, it is sometimes necessary. For example, the Federal Communications Commission (FCC) has adopted a report and order for an enhanced 911 (E-9-1-1) wireless service that requires the location of a mobile station (e.g., a cellular phone) to be provided to a Public Safety Answering Point (PSAP) each time a 911 call is made from the mobile station. In addition to the FCC mandate, a network operator/service provider may support various applications that use location based services. Such services provide the location of mobile stations. The term "applications" refers to the particular uses that are made of location information. Often times, applications are implemented with computer software that is either executed by a processor within a mobile station or by a processor located within a component of a wireless infrastructure network that is in communication with the mobile station. Applications that use this information may include, for example, location-sensitive billing, asset tracking, asset monitoring and recovery, fleet and resource management, personal-location services, and so on. Some specific examples of applications for personal-location services include (1) providing a local map to a mobile station based on its location, (2) providing a recommendation for a facility (e.g., a hotel or a restaurant) based on the mobile station's location, and (3) providing directions to the recommended facility from the mobile station's current location.

Currently, in at least some situations, use of location based services (i.e., either a mobile station that desires to know its location, or an entity that desires the location of a mobile station) requires payment to the service provider. In order to ensure that such payment can be collected, as well as to ensure privacy and for other reasons, it is critical to "authorize" the application. Authorization of an application refers to the act of verifying that there is "sufficient" identity and billing information. Such identity and billing information includes such things as: 1) billing address, and 2) authorization from the service provider to access the requested location information, and 3) agreement between the party to be billed and the billing entity (i.e., the service provider) regarding the terms and conditions under which requested location information will be provided. That identity and billing information is considered to be "sufficient" if it: 1) allows the service provider to bill and collect fees from the party using the location based services (e.g., providing the position location information) and 2) protects the privacy of anyone about whom location information will be made available.

It is typically the case that applications accessed by a mobile station are run within a component that is within the network. In such cases, the application will typically need to trigger the mobile station to respond to external requests for information or to begin running an application within the mobile station for the purpose of allowing the position of the mobile station to be determined. However, in light of the above stated concerns for both privacy and to ensure that billing is not neglected, there is a need for some security to be put in place that would ensure that the mobile station is not triggered by an external device that is not authorized to do so. The presently disclosed method and apparatus is provided such assurance.

SUMMARY

The presently disclosed method and apparatus allows an application executed within a mobile station to be triggered only by a mobile positioning center (MPC). The mobile station communicates with a component of the communication infrastructure, which in accordance with one embodiment of the disclosed method and apparatus is a component within a cellular communication network infrastructure. A typical cellular communication network infrastructure includes a base station through which signals are transmitted over the air between a wireless mobile station and the network. An MPC is coupled to the base station using any one of a variety of potential configurations that are well known in the art. In accordance with the presently disclosed method and apparatus, the MPC is responsible for authorizing an application that is either resident within the mobile station or that is run in a device that is resident elsewhere in the network. The mobile station communicates with the MPC over a communication link through the base station and other infrastructure components. In accordance with the presently disclosed method and apparatus, the mobile station will only respond to attempts to trigger particular operations (e.g., run particular applications) if the mobile station receives an short message services (SMS) message as defined by Interim Specification 637A (IS-637A) which is published by the Telecommunication Industry Association (TIA)/Electronics Industry Association (EIA). More specifically, that SMS message must include an SMS Teleservice Identifier that has a particular pre-assigned value.

Various aspects and embodiments of the invention are described in further detail below.

BRIEF DESCRIPTION OF THE DRAWINGS

The disclosed method and apparatus will become more apparent from the detailed description set forth below when taken in conjunction with the following figures in which like reference characters identify like elements.

DETAILED DESCRIPTION

Figure 1:
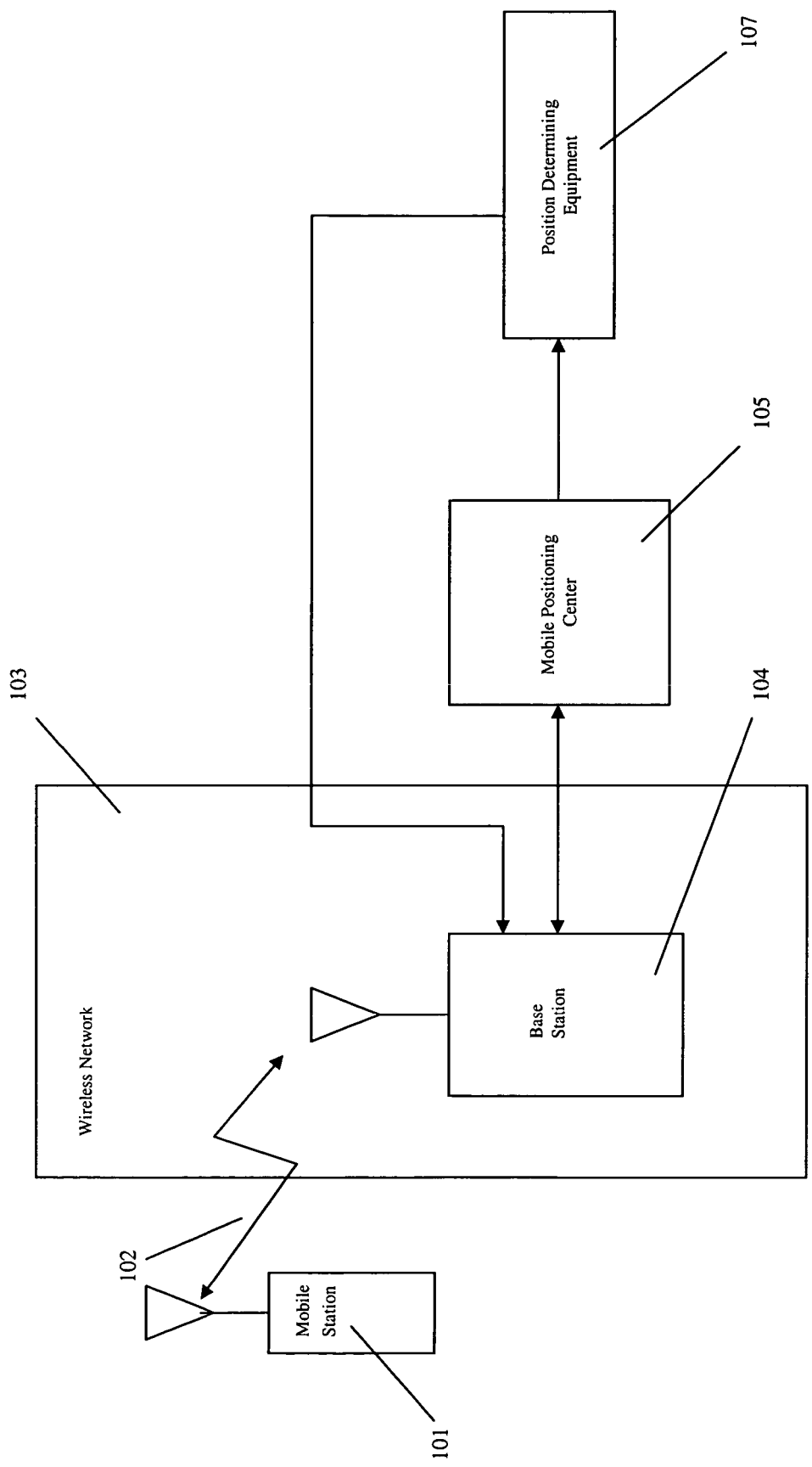
FIG. 1 is a simplified block diagram illustrating a system including a mobile station, wireless communication network, mobile positioning center (MPC), and position determining equipment (PDE) in accordance with the disclosed method and apparatus.

FIG. 1 is a simplified block diagram illustrating a system 100 including a mobile station 101, wireless communication network 103, mobile positioning center (MPC) 105, and position determining equipment (PDE) 105 in accordance with the disclosed method and apparatus. The mobile station 101 may be any wireless device capable of supporting location based services (LBSs) in conjunction with an LBS application that may be run either within the mobile station 101 or external to the mobile station 101. For the purpose of this document, LBS applications include any program, applet, routine, or other such computer implemented algorithm that uses the location of either the mobile station in which the application is running or the location of another mobile station to provide information or service to a user. Examples of such LBS applications include programs that can: 1) identify the location of a mobile station being operated by another person to allow the LBS client (i.e., the person requesting the LBS service) to locate another person using a properly equipped mobile station; 2) locate a nearby product or service outlet and provide the user with directions to the outlet, such as an automatic teller machine or restaurant; 3) track a properly equipped mobile station, etc. Examples of wireless devices include cellular telephones, wireless modems, personal information managers (PIMs), personal digital assistants (PDAs), etc.

As shown in FIG. 1, the mobile station 101 communicates over a wireless link 102 with the wireless network 103. The wireless network 103 includes at least a base station 104 capable of receiving information from, and transmitting information to, the mobile station 101 over the wireless link 102. For the purposes of this disclosure, the base station 104 includes various other components of the wireless network 103 which are not shown for the sake of simplicity, such as base station controllers (BSCs), mobile switching centers (MSCs), etc.

The base station 104 is coupled to the MPC 105 by any conventional communication medium, including, but not limited to cables, microwave links, satellite communication links, etc. Similarly, the MPC 105 is coupled to the PDE 107 by any conventional communication medium.

Figure 2:
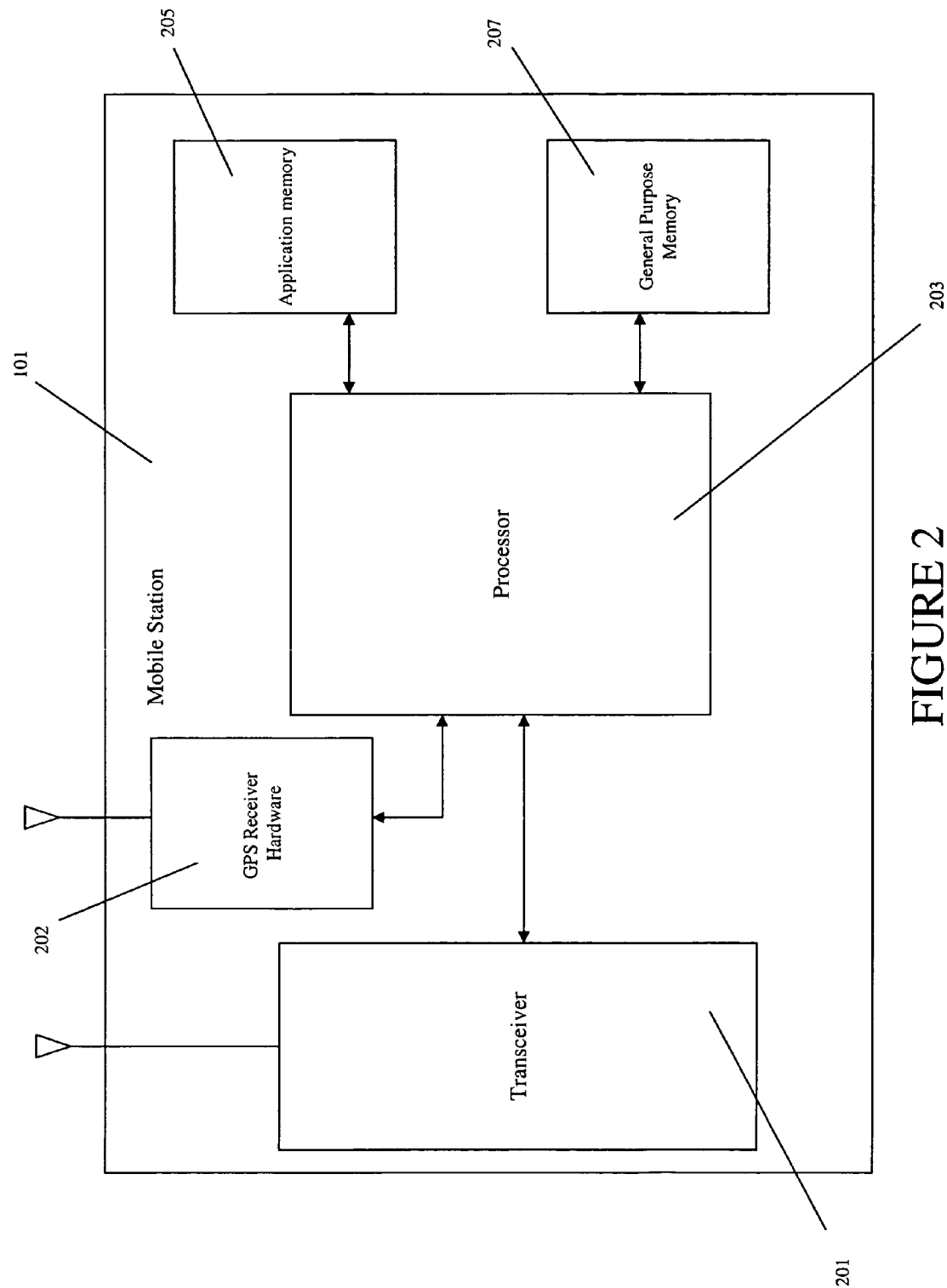
FIG. 2 is a simplified block diagram of the components of a mobile station 101 in accordance with the disclosed method and apparatus.

FIG. 2 is a simplified block diagram of the components of a mobile station 101 in accordance with the disclosed method and apparatus. The mobile station 101 shown in FIG. 2 includes a transceiver 201, processor 203, application memory 205 and general purpose memory 207. The processor 203 is shown as one block. However, it should be understood by those skilled in the art that the functions disclosed as being performed by the processor 203 may be performed by a collection of discrete processors either acting in concert or operating independently. Accordingly, such a collection of processors may be either coupled together in order to perform the disclosed functions or they may operate completely independent of one another. Furthermore, in accordance with alternative embodiments of the disclosed method and apparatus, the application memory 205 and general purpose memory 207 may be combined into a single memory device that stores the information disclosed herein as being stored in these two memories 205, 207. In yet another alternative embodiment, the mobile station 101 might comprise several additional independent memory devices that share responsibility for storing information within the mobile station 101.

In accordance with one embodiment of the presently disclosed method and apparatus, the processor 203 has several functions that operate in concert as a protocol stack. However, it should be understood that this particular configuration is not essential to the disclosed method and apparatus.

Figure 3:
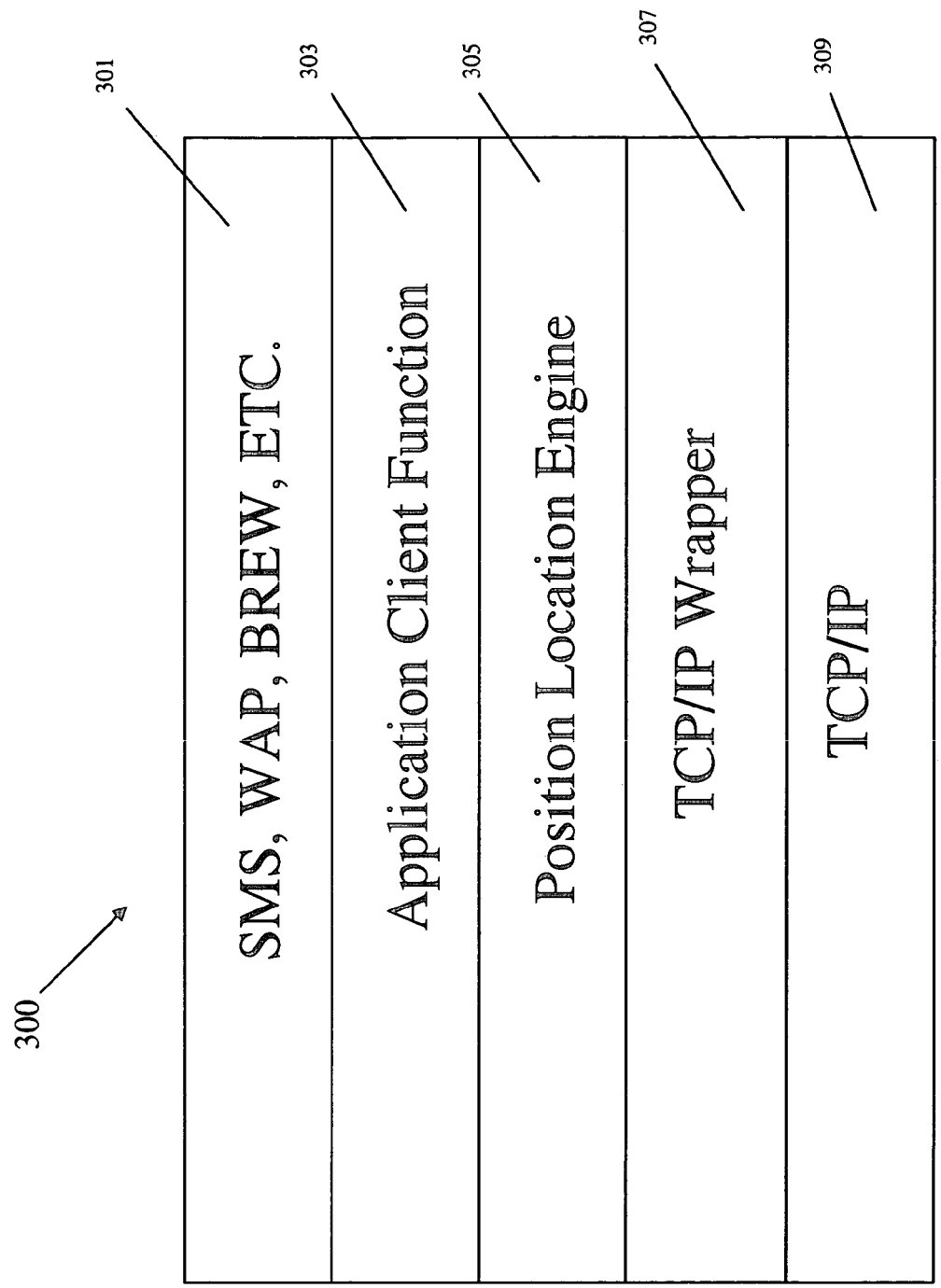
FIG. 3 is a schematic diagram of an example of a protocol stack 300 used within one embodiment of the disclosed method and apparatus.

FIG. 3 is a schematic diagram of an example of a protocol stack 300 used within one embodiment of the disclosed method and apparatus. For the purpose of this disclosure, a protocol stack is any set of routines or program instructions that operate together, typically with one routine building on and using the functions of another lower level routine or program. A first function within the protocol stack 300 of FIG. 3 is the operating system 301. The operating system 301 is a foundational function upon which other functions build. That is, the operating system 301 includes functions that can be accessed and used by the other functions performed within the processor 203. In accordance with one embodiment of the presently disclosed method and apparatus, the operating system 301 is a Binary Run-time Environment for Wireless (BREW) operating system. Alternatively, the operating system 301 is a Wireless Application Protocol (WAP). In yet another alternative embodiment, the operating system is a Short Message Service (SMS) operating system. In yet another alternative, the operating system is a Java operating system, etc. Java is a trademark for the operating system of Sun Microsystems. Those skilled in the art will appreciate that the particular operating system used is not directly relevant to the presently disclosed method and apparatus for authorizing an LBS application 303 to run within the mobile station 101.

In accordance with one embodiment, an application client function 303 runs on top of the operating system 301. In one example, the application client function 303 is an LBS application that may access and utilize user interface functions to receive information from the mobile station user through a conventional data input device, such as a keyboard or touch screen. Such an LBS application may also access and utilize the operating system functions to provide information back to the mobile station user through a liquid crystal diode (LCD) display screen. In another example, the application client function 303 is a routine that interfaces between the operating system 301 and higher layers of the protocol stack 300 to initiate a position location determination operation.

One function of the application client function is to assist in locating the mobile station 101. In addition, if the application client function is an LBS application, the application may determine what points of interest and service outlets are in the vicinity of the mobile station (e.g., shops, automatic teller machines, restaurants, museums, etc.) and provide navigational directions and maps to the user based on a knowledge of the location of the mobile station and the location of particular service outlets and points of interest.

The application client function 303 assists in locating the mobile station 101 by accessing a position location engine 305. The position location engine 305 may be any function capable of either determining the location of the mobile station 101 itself, or capable of providing information, such as pseudo-ranges to GPS satellites, that are useful in aiding another device in determining the location of the mobile station 101. In one embodiment of the disclosed method and apparatus, the position location engine 305 is a component of a global positioning satellite (GPS) system. The position location engine 305 in this example includes a GPS receiver function that allows the mobile station 101 (together with the GPS receiver hardware 202) to receive information from GPS satellites for the purpose of determining the location of the mobile station 101.

In addition, in one embodiment of the disclosed method and apparatus, the position location engine 305 requests and receives aiding information from the PDE 107. For example, in one embodiment, the mobile station 101 requests information as to which satellites are "in view". If a satellite is in view, then the mobile station 101 should be able to receive and demodulate information from that satellite.

In addition, the mobile station 101 might request information regarding the locations of the "in view" satellites, information about correction factors to be used when calculating the location of the mobile station 101 using information received from the in view satellites, information regarding the amount of Doppler shift that the mobile station 101 might expect to encounter when receiving signals from the in view satellites, and other such useful information. This information enables the mobile station 101 to more rapidly detect and "acquire" satellites. Acquisition of a satellite refers to the process by which the mobile station 101 receives signals transmitted from the satellite and aligns the received information with local timing within the mobile station 101 in preparation for the mobile station 101 to interpret information modulated on the signals transmitted by the satellite. A further discussion is provided below regarding the process of receiving aiding information from the PDE 107.

FIG. 3 also shows an SMS messaging protocol layer 307. The SMS messaging protocol layer 307 provides support for sending and receiving messages in accordance with the well-known SMS communication protocol outlined in IS-637A and IS-41, both published by the TIA/EIA. Accordingly, information that is to either received or transmitted by the mobile station 101 is provided to the SMS messaging protocol layer 307. The SMS messaging protocol layer 307 then formats the information appropriately in accordance with the SMS protocol specification so that other devices to which the information is to be transmitted can receive and interpret the information sent by the mobile station 101.

In addition, the SMS messaging protocol layer will route messages to the appropriate lower level protocol layer based upon data in the received message. In particular, SMS messages have a field commonly known as the SMS teleservice identifier. Depending upon the value carrier within the SMS teleservice identifier field, the SMS message will be routed to different components for interpretation. In accordance with the presently disclosed method and apparatus, a particular value in the SMS teleservice identifier field is associated with messages that are intended to be interpreted by the position location engine 305. All other messages are sent to another protocol layer to be interpreted and acted (or not acted) upon. A significant feature of the SMS teleservice identifier field is that, as opposed to the payload fields within an SMS message, the SMS teleservice identifier field can only be altered (i.e., information can only be put into the field) by selected components within the communications system. The most significant of these components is the MPC 105. Accordingly, if only network components are capable of altering the value of the SMS teleservice identifier field, and the mobile station 101 will only route messages to the position location engine 305 if the value of the SMS teleservice identifier field is a particular predetermined value, then a secure system can be established for allowing access to the position location engine 305 within the mobile station 101.

Figure 4:
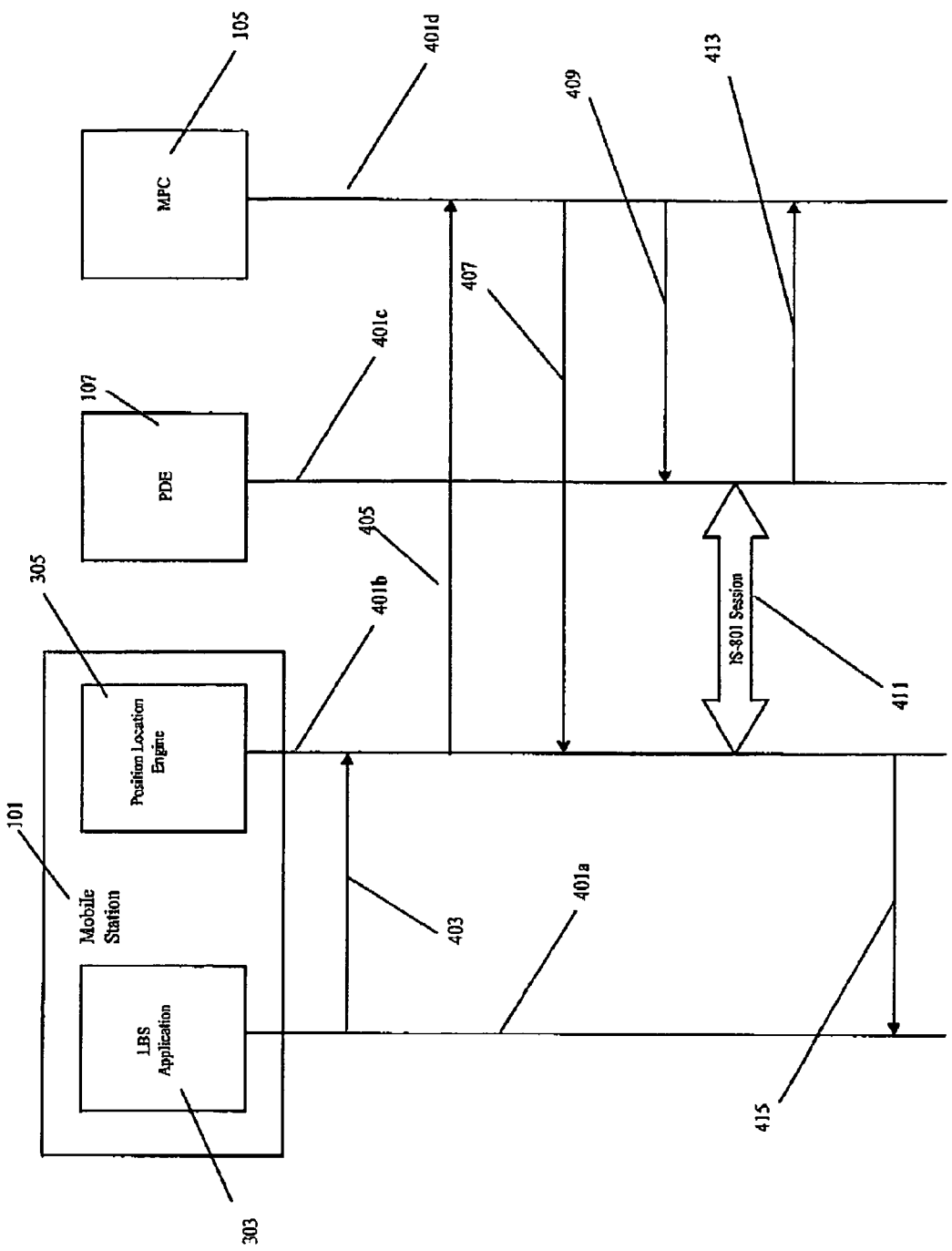
FIG. 4 is a schematic diagram showing the sequence of messages passed between various components of a system implementing the disclosed method and apparatus.

FIG. 4 is a schematic diagram showing the sequence of messages passed between various components of a system 100 implementing the disclosed method and apparatus. Blocks shown across the top of FIG. 4 represent each of these components. These components include the SMS messaging protocol layer 307, application client function 303, the position location engine 305, the PDE 107, the MPC 105, a Mobile Center (MC) 402 and an LBS client 403. A line 401 vertically descending from each component 303, 305, 107, 105, 402, 403 represents a passage of time. The points of the line closest to the components 303, 305, 107, 105, 402, 403 represent the most recent points in time.

Initially, the LBS client 403 (such as another mobile station) requests the position of the mobile 101 from the MPC 105 as indicated by the arrow 405. The MPC 105 is responsible for determining whether the request is authorized. Upon determining that the request is authorized, the MPC 105 provides a "GPOSREQ" message 407 to the PDE 107 in addition to providing a mobile terminated (MT) SMS message 409 to the mobile station 101. The GPOSREQ message 407 to the PDE 107 seeds the PDE 107 with information that assists the PDE 107 to work together with the position location engine 305 in determining the location of the mobile station 101. In particular, the GPOSREQ message 407 provides the PDE 107 with information regarding the location of the base station 104 with which the mobile station 101 is in communication. This information allows the PDE 107 to determine the location of the mobile station 101 to within a couple of miles or less. The PDE 107 can then most effectively provide aiding information to assist the position location engine 305 within the mobile station 101 to more easily determine which satellites are in view and to acquire those satellites far more rapidly.

The MT SMS message 409 sent from the MPC to the MC 402. The MC 402 then determines that the message is intended to trigger the mobile station 101 to perform a position location operation. Accordingly, the MC 402 formats a message 411 to the SMS messaging protocol layer 307 within the mobile station 101. The message 411 from the MC 402 to the SMS messaging protocol layer 307 includes a predetermined value in the teleservices identification field. In one embodiment of the disclosed method and apparatus, a value of 65001 is selected as the predetermined value that indicates that the SMS messaging protocol layer 307 should interpret the incoming MT SMS message as a message intended for the application client function 303 and ultimately for the position location engine 305. Upon receiving the message 411 containing the predetermined value in the teleservices identification field, the SMS messaging protocol layer 307 passes the information contained in the payload of the SMS message 411 to the application client function 303 in a message 413 from the SMS messaging protocol layer 307 to the application client function 303.

The application client function 303 then sends a message 415 to the position location engine 305. The application client function 303 formulates the message 415 to the position location engine 305 to command the position location engine 305 to begin sending and receiving position location related information to and from the PDE 107 in accordance with IS-801, as published by the TIA/EIA. The result of this "IS-801 session" 417 is the determination of the position of the mobile station 101. The PDE, then transmits the position of the mobile station 101 to the MPC 105 in a message 419. The MPC 105 in turn transmits the position of the mobile station 101 to the LBS client 403.

Since the MC 402 is uniquely enabled within the network to alter the bits in the teleservices identification field of the SMS message, there is no possibility for an unauthorized entity, such as a rouge mobile station, to provide an unauthorized trigger to the mobile station 101 to allow the location of the mobile station 101 to be determined without proper authorization.

The description of the methods and apparatuses is provided to enable any person skilled in the art to make or use the invention defined by the claims appended hereto. Various modifications to these methods and apparatuses will be readily apparent to those skilled in the art. However, the generic principles defined herein may be applied to other embodiments of the methods and apparatuses without departing from the spirit or scope of the claimed invention. Thus, the claimed invention is not intended to be limited to the embodiments of the methods and apparatuses shown herein, but rather is to be accorded the widest scope consistent with the principles and novel features disclosed herein.

What is claimed is:

1. A method for authenticating an application run on a mobile station, including:
    a. attempting to run Location Based Service (LBS) application;
    b. requesting authentication of the LBS application;
    c. communicating directly with a mobile positioning center (MPC) in order to have the MPC fulfill the request for authentication of the LBS application;
    d. if the application is authenticated, then receiving within the mobile station a Short Message Service (SMS) message originated at the MPC and having a teleservice identifier field within the SMS message identifying a position location engine within the mobile station as a destination of information required to continue running the LBS application in response to the application being authenticated.

2. The method of claim 1, further including:
    a. if the LBS application has not been authenticated, receiving a response message indicating that authentication failed; and
    b. in response to receipt of the response message, halting the LBS application.

3. The method of claim 1 wherein the LBS application that is attempted to run on the mobile station requires authentication from the MPC in order to receive all required information.

4. The method of claim 1, wherein the authentication of the LBS application to be run on the mobile station is independent of other authentication operations to be requested by the mobile station for the purpose of authenticating telephone communication.

5. The method of claim 4, wherein the authentication of the LBS application to be run is further independent of other authentication operations to be requested in order to authenticate other applications.

6. The method of claim 3, wherein the authentication of the LBS application by the MPG allows the mobile station to communicate with other components.

7. The method of claim 6, wherein the other components include a position determination entity.

8. The method of claim 1, wherein receiving the SMS message comprises receiving the SMS message having the teleservice identifier field set by the MPC.

9. The method of claim 1, wherein receiving the SMS message comprises receiving the SMS message having the teleservice identifier field indicating the SMS message is intended for the LBS application.

10. A method for authenticating an application run on a mobile station, including:
    attempting to run Location Based Service (LBS);
    requesting authentication of the LBS application;
    communicating directly with a mobile positioning center (MPC) in order to have the MPC fulfill the request for authentication of the LBS application; and
    if the application is authenticated, receiving within the mobile station a Short Message Service (SMS) message having a teleservice identifier field within the SMS message set to a predetermined value, wherein receiving the SMS message comprises receiving the SMS message having the teleservice identifier field indicating the SMS message is intended for a position location engine within the mobile station.

11. The method of claim 10, wherein receiving the SMS message comprises receiving the SMS message having the teleservice identifier field set by the MPC.

12. The method of claim 10, wherein receiving the SMS message comprises receiving the SMS message having the teleservice identifier field indicating the SMS message is intended for the LBS application.

* * * * *